Patented Mar. 26, 1935

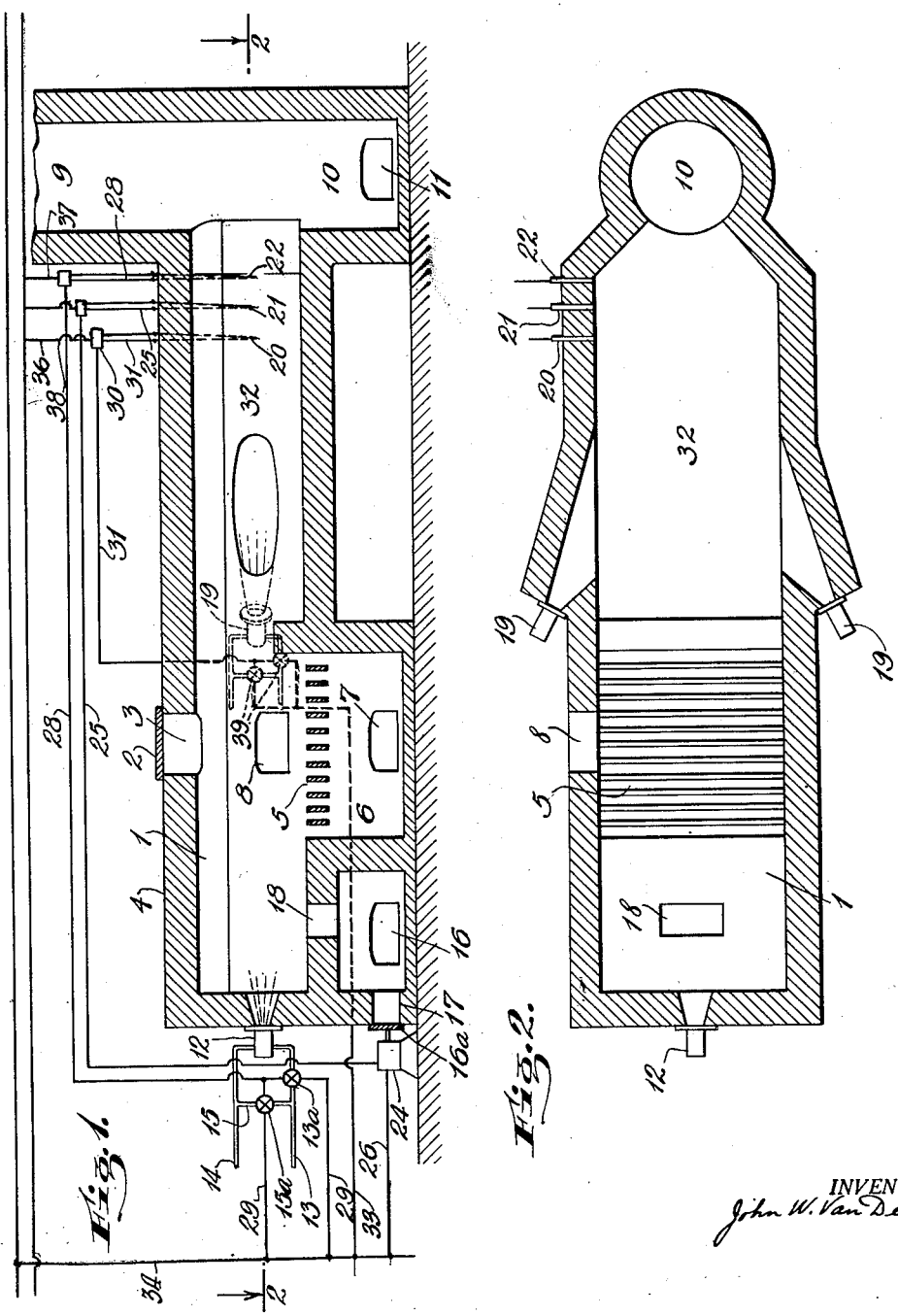

1,995,723

UNITED STATES PATENT OFFICE 1,995,723

APPARATUS FOR PREVENTING NUISANCE IN INCINERATING WASTE MATERIALS

John W. Van Denburg, White Plains, N. Y.

Application January 17, 1931, Serial No. 509,379

2 Claims. (Cl. 110—8)

This invention relates to a method for preventing nuisance attending the incineration of waste materials, and more particularly to the prevention of nuisance resulting from the operation of incinerators, refuse disposal furnaces, and the like, when incinerating garbage, refuse, sewage, solids, kitchen waste and the like materials which give off a relatively large amount of objectionable gases during the process.

The object of the invention is to provide a method whereby garbage, refuse, sewage screenings and the like materials may be disposed of by incineration without attending nuisance at any stage of the process of incineration.

Another object is to provide a method whereby incineration of garbage, refuse, sewage screenings and the like materials, may be carried to a successful conclusion with a minimum amount of auxiliary fuel, and at the same time obviate nuisance.

Nuisance is the term commonly applied in sanitary engineering to designate or describe a condition which is objectionable from the standpoint of health or aesthetics. An example of such a condition would be the issuance of poisonous or unsightly smoke or, the issuance of gases of a poisonous nature or of a disagreeable odor from an incinerator or a burning refuse pile or dump. This would constitute a nuisance in its accepted meaning, and where I make use of the term nuisance herein it is in the sense as set forth.

In the disposal of waste materials by incineration one of the principal difficulties to be overcome, and which constitutes the greatest objection to use of the process, is the presence of a visible smoke and the presence of disagreeable and offensive odors in the discharge from the flue, stack, or chimney. Waste materials such as garbage, refuse, sewage screenings, kitchen waste and the like are composed largely of organic matter in various stages of decomposition and a very large percentage of liquid. When such materials are to be incinerated they are, at the beginning of the process, usually at approximately the same temperature as the surrounding atmosphere. With the continued application of heat the temperature rises to a point where the liquids are driven off in the form of vapor, as well as some of the more volatile matter. Further application of heat results in the driving off of all of the volatile matter, leaving behind the solid matter in the form of carbon which constitutes a fuel or heat value and is combustible in the well known manner.

The immediate results of the process of incineration are the same, whether it consists of a slow burning unenclosed garbage pile or dump on the one hand, or an enclosed high temperature chamber or furnace into which the material is cast on the other hand, the only difference being is the time in which the process is completed.

Many of the resulting gases are combustible at sufficiently high temperatures and practically all of the gases having objectionable odors are decomposed at proper temperatures with the consequent destruction and elimination of the objectionable odors. The maximum temperatures required to accomplish these results are known to be from 1200 to 1300 degrees Fahrenheit. It is also known that where the process of combustion is complete, there is no attending smoke.

Numerous types of incinerators, destructor furnaces and the like, have been designed and are in use. Some of these depend on the fuel value contained in the refuse to support the combustion, after a preliminary fire has been started. Others employ an auxiliary fire continuously to hasten the process and in some cases this is a necessity for the reason that the refuse material does not contain sufficient fuel or heat value to support the combustion; as an example, sewage screenings, kitchen waste and the like, which contains a large percentage of water. Some of these incinerators have multiple chambers in which the combustion is continued, and employ large amounts of auxiliary fuel in the attempt to keep the temperature of the exit gases high enough to insure complete combustion and decomposition of obnoxious gases.

It is evident that when charges of fresh refuse are fed into the furnace, or when the stoking doors are opened to stoke the mass of incinerating refuse, or when the incinerator is started in operation, the temperature in the combustion chambers will be lowered with the resulting smoke from incomplete combustion, and obnoxious odors due to undecomposed gases, constituting a nuisance which continues until such time as the temperatures are again brought to the required point.

If sufficient auxiliary fuel is employed to maintain the temperature under any and all conditions of operation, at a point where all obnoxious gases will be decomposed, it is evident that a relatively great amount of fuel will be unnecessarily used, and the unnecessarily high temperatures prevailing over the greater period of operating time will be detrimental to the life of the equipment.

I have provided a method whereby the incinerating process may be carried on continuously without nuisance at any time during the operation, and at the same time accomplishing the result with a minimum quantity of auxiliary fuel and a minimum deterioration of the structures.

My invention consists essentially in providing a zone, either in the gas passage from the furnace of an incinerator to the chimney, or in an indepenent structure between the incinerator and the chimney, but through which the gases from the furnace of the incinerator must pass, where the temperature of the passing gases are automatically raised and maintained substantially above the point at which nuisance occurs. Ordinarily the temperature of 1300 degrees Fahrenheit will insure the decomposition of obnoxious gases and the destruction of offensive odors.

The temperature in this zone is maintained by means of a booster burner or burners directing their flame into the zone, preferably utilizing oil or gas as a fuel, and having the fuel supply to the burners automatically controlled and regulated by the temperature of the gases leaving the zone, so that the temperature will not fall below a predetermined point, thus obviating nuisance, and a means for automatically admitting additional air into the furnace, gas passage or zone, also controlled and regulated by the temperature of the exit gases, if necessary to prevent the temperature rising to any substantial degree above the predetermined point and to provide auxiliary air for the completion of combustion.

Further objects, features and advantages will more clearly appear from the detailed description following taken in connection with the accompanying drawing forming a part of this specification.

In the drawing—

Figure 1 is a sectional elevation in conventional form of equipment for employing my method.

Figure 2 is a sectional plan in conventional form along line 2—2.

Similar numerals refer to similar parts throughout.

Referring to the drawing, an incinerator 1, provided with charging door 2 covering hole 3 through which material is dumped from charging floor 4 onto receiving area 5 over ash pit 6 which is equipped with cleanout door 7, stoking door 8, air inlets 16, and auxiliary air inlet 17, is connected to chimney or stack 9 having dust chamber 10 and cleanout door 11. Such incinerators are well known to those versed in the art, and are in common usage in many variations of form and structure.

When the character of the refuse to be incinerated is of such a character as to require auxiliary fuel to accomplish the destruction of the refuse, a burner 12 is employed preferably utilizing oil or gas as a fuel. The fuel to burner 12 is controlled through supply pipe 13, return pipe 14, by-pass pipe 15, and ordinarily, hand operated supply valve 13a, and by-pass valve 15a. Air for combustion enters through inlet 16, and inlet 18, while air inlet 17 for auxiliary air is controlled by damper door 16a. These are all conventional features of an incinerator employing auxiliary fuel, and the particular arrangement of these usual features is not an essential part of my invention, but are shown thus to illustrate conventionally the application of my method for the prevention of nuisance.

When my method is used, the fuel supply valve 13a and by-pass valve 15a are electrically operated interlocked valves of any preferred commercial type and power for operation is supplied by electrical wiring 29. With this arrangement for remote control of the auxiliary fuel supply, it is automatically regulated through electrical connection 28, the usual thermostatic control equipment 27, and a thermocouple 22 located at the exit end of the gas passage or zone 32 and in contact with the exit gases. Zone 32 may be a part of the gas passage in an incinerator or it may be contained in a separate structure. Booster burners 19 also employing oil or gas as a fuel, are located so that the flame is projected into gas passage or zone 32. The arrangement for fuel supply to booster burners 19 is essentially the same in arrangement as that for auxiliary burner 12, the fuel supply and by-pass valves 39 being electrically operated and interlocked. The fuel supply to booster burners 19 is then automatically regulated through electrical connection 31, the usual thermostatic control equipment 30, and a thermocouple 20 located at the exit end of gas passage or zone 32 and in contact with the exit gases.

The entrance of auxiliary air is automatically regulated by means of damper door 16a, which is opened or closed by any suitable commercial type of electrically controlled electrically operated mechanism 24 receiving its operating power through wiring 26.

The mechanism 24 is governed in its operation through electrical connection 25, usual thermostatic control equipment 23 and thermo-couple 21 located at the exit end of gas passage or zone 32, in contact with the exit gases.

All of the equipment thus described can be secured through commercial channels, and can be assembled, erected or constructed by anyone skilled in the art. My method for prevention of nuisance can be adapted to practically any type of incinerator already operating, whether employing auxiliary fuel, or depending on the fuel value of the refuse for incineration. The details of the aforementioned electrical connections for the several control and operating elements are shown diagrammatically in Figure 1 and include the connection of wires 26, 29 and 33 by wire 34 to one side of an electric power supply line 35, and the connection of control equipments 23, 27 and 30 by wires 36, 37 and 38, respectively, to the other side of the power supply line 35. The thermocouples 20, 21 and 22 are each connected by double wires 31', 25' and 28', respectively, to control equipments 30, 23 and 27, respectively, for actuating the same, and the latter control the valves 39 of the booster burner 19, operating mechanism 24 of damper 16a, and valves 13a and 15a of burner 12, respectively, in the manner described.

The equipment having been assembled in accordance with the preferred embodiment as set forth, the operation to obviate nuisance, is as follows:

The proper temperature to be maintained in gas passage or zone 32 is selected, say 1300 degrees Fahrenheit. Thermostat control equipment 30 is set at such a point that when the temperature of the gases at exit begins to rise above 1300 degrees it is actuated by thermo-couple 20, and commences to close down the fuel supply to booster burners 19, by means of electrically operated interlocked valves similar to 13a and 15a. This diminishes the flame from booster burners 19 and when and if the temperature of the exit gases have reached 1325 degrees burners 19 are completely closed down and thermo-couple 22 will act to close down auxiliary burner 12 through thermostatic control equipment 27 which is previously set to operate at this point, and electrically operated interlocked fuel supply valves 13a and 15a. This action further reduces the auxiliary heat being put into the furnace, thus conserving the fuel supply while maintaining the temperature above the required point in zone 32.

If the temperature at the exit continues to rise to a point say 1350 degrees, the booster burners 19 and the auxiliary burner 12 are completely closed down, and thermo-couple 21 through thermostatic control equipment 23 which is previously set at this point, actuates mechanism 24 which opens to admit auxiliary air thus further tending to lower the temperature of the gases back to the 1300 degree point. This serves to prevent excessive deterioration of the structures which usually occurs at high temperatures. When complete control of the exit gas temperature has been obtained and the temperatures start downward the operation of the mechanism is reversed so that if and when the temperature of the exit gases approach 1300 degrees Fahrenheit again, all of the means are combined to prevent its lowering below the 1300 degree mark.

Thus it is seen that within an operating range of say 50 to 25 degrees Fahrenheit I have provided a method whereby a zone for the passage of the gases issuing from an incinerating furnace is automatically maintained above a temperature at which the smoke and obnoxious gases will be decomposed and objectionable odors destroyed, thus preventing nuisance at all stages of the incinerating process, and with the employment of a minimum amount of fuel to reduce the refuse material to ash; also, since the temperatures of the gases are held substantially constant within 50 to 75 degrees of a predetermined point, refractories for the lining of the structure can be secured economically which will successfully resist deterioration and give long service, which is not feasible where the gas temperature is allowed to rise to high points as is the case in an incinerator of the types commonly in use.

I claim—

1. In apparatus for incinerating refuse materials having a furnace chamber for burning refuse material, the combination of a second chamber through which the gases of combustion pass from the first chamber, regulatable means to supply secondary air to said furnace chamber to mix with said gases, fuel supply means operatively associated with said secondary chamber to maintain the temperature of the gases passing therethrough sufficiently high to obtain substantially complete combustion and to render such gases non-noxious, and means responsive to the temperature of the gases positioned adjacent the exit of the second chamber and operable to control said secondary air means and said fuel supply means.

2. An incinerator comprising in combination a primary combustion chamber for the reception and incineration of refuse material, regulatable means to supply secondary air to the combustion gases in said primary chamber, a secondary chamber communicating with the primary chamber and having an exit for the combustion gases, burner means for introducing fuel into the secondary chamber, means responsive to changes in temperature positioned within the secondary chamber adjacent the exit, and means operatively connecting the temperature responsive means, the secondary air supply means, and the burner means to control the fuel and the oxygen content of the combustion gases delivered to the secondary chamber, said burner being so positioned as to control the temperature of the gases passing through said exit, whereby the exit gases will be maintained at a constant temperature sufficiently high to render said gases non-noxious.

JOHN W. VAN DENBURG.